US006253018B1

(12) United States Patent
Moriyama et al.

(10) Patent No.: US 6,253,018 B1
(45) Date of Patent: *Jun. 26, 2001

(54) INFORMATION RECORD MEDIUM, APPARATUS FOR RECORDING THE SAME AND APPARATUS FOR REPRODUCING THE SAME

(75) Inventors: Yoshiaki Moriyama; Ryuichiro Yoshimura, both of Saitama-ken; Takao Sawabe, Tokyo-to; Junichi Yoshio, Saitama-ken; Akihiro Tozaki, Saitama-ken; Kaoru Yamamoto, Saitama-ken, all of (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/404,765

(22) Filed: Sep. 24, 1999

Related U.S. Application Data

(63) Continuation of application No. 08/806,459, filed on Feb. 26, 1997.

(30) Foreign Application Priority Data

Feb. 28, 1996 (JP) ........................................ 8-41942

(51) Int. Cl.[7] ................................ H04N 5/91; H04N 7/00
(52) U.S. Cl. ................................ 386/46; 386/95; 386/126
(58) Field of Search ................................ 386/95, 125, 98, 386/126, 45–46, 69–70, 33; 360/18, 20, 27

(56) References Cited

U.S. PATENT DOCUMENTS 5,532,833  7/1996  Hong et al. .................. 358/335
5,602,956  2/1997  Suzuki et al. ................. 386/68

5,652,824  7/1997  Hirayama et al. .................. 386/95

(List continued on next page.)

FOREIGN PATENT DOCUMENTS

0607904 A2  *  7/1994  (EP)  ........................ H04N/5/92
0 677 842 A1    10/1995  (EP) .

(List continued on next page.)

OTHER PUBLICATIONS

Yoshinobu Tonomura and Shinji Abe, Content Oriented Visual Interface Using Video Icons for Visual Database Systems, Academic Press 1990, pp. 183–198.

*Primary Examiner*—Wendy R. Garber
*Assistant Examiner*—Vincent F. Boccio
(74) *Attorney, Agent, or Firm*—Morgan, Lewis & Bockius LLP

(57) ABSTRACT

An information recording apparatus (SS1) is provided with: a signal process device (72) for applying a predetermined signal process to record information (R), which is to be recorded onto an information record medium (1: DVD) and is inputted from the external, to output processed record information (Sr), and for dividing control information (Si), which corresponds to the record information and is inputted from the external, into search control information (Sdsi, DSI), which is information to search a record position of the record information to be reproduced at a time of reproducing the record information, and reproduction display control information (Spci, PCI), which is information to control a reproduced display of the record information at the time of reproducing the record information, to output the search control information and the reproduction display control information; a multiplex device (75, 76) for multiplexing the processed record information, the search control information and the reproduction display control information to output multiplexed record information (Sap); and a record device (77, 78) for recording the multiplexed record information onto the information record medium.

12 Claims, 13 Drawing Sheets

U.S. PATENT DOCUMENTS

| | | | |
|---|---|---|---|
| 5,715,354 | * | 2/1998 | Iwamura et al. .................... 386/68 |
| 5,732,185 | | 3/1998 | Hirayama et al. .................. 386/70 |
| 5,870,523 | * | 2/1999 | Kikuchi et al. ..................... 386/95 |
| 5,915,066 | * | 6/1999 | Katayama ........................... 386/70 |
| 5,930,450 | * | 7/1999 | Fujita ................................. 386/95 |
| 6,006,004 | * | 12/1999 | Moriyama et al. ................. 386/46 |

FOREIGN PATENT DOCUMENTS

| | | |
|---|---|---|
| 0 696 798 A1 | 2/1996 | (EP) . |
| 0 724 264 A2 | 7/1996 | (EP) . |
| 0 737 980 A2 | 10/1996 | (EP) . |
| 0 738 078 A2 | 10/1996 | (EP) . |
| 0 752 703 A2 | 1/1997 | (EP) . |
| 0 788 094 A1 | 8/1997 | (EP) . |
| 0 788 101 A1 | 8/1997 | (EP) . |
| 0 847 196 A1 | 6/1998 | (EP) . |
| 0 847 197 A1 | 6/1998 | (EP) . |
| 0 847 198 A1 | 6/1998 | (EP) . |
| 0 847 200 A1 | 6/1998 | (EP) . |
| WO 95/12179 | 5/1995 | (WO) . |

\* cited by examiner

STRUCTURE OF INTERLEAVED UNIT

IU : INTERLEAVED UNIT

FIG. 5A

DSI DATA

- GENERAL INFORMATION
- SEAMLESS INFORMATION
- ANGLE JUMP DESTINATION INFORMATION
- VOB UNIT SEARCH INFORMATION
- SYNCHRONOUS REPRODUCTION INFORMATION

FIG. 5B

PCI DATA

- GENERAL INFORMATION
- ANGLE JUMP DESTINATION INFORMATION
- HIGH LIGHT INFORMATION

TIME SEARCH OPERATION

INFORMATION RECORD MEDIUM, APPARATUS FOR RECORDING THE SAME AND APPARATUS FOR REPRODUCING THE SAME

This appln is a continuation of Ser. No. 08/806,459 Feb. 26, 1997.

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

Namely, for example, in case of giving audience to a foreign movie on the LD, it is not possible to select one of languages to be used for a subtitle (caption) displayed on the picture plane (e.g., select one of the subtitle in Japanese and the subtitle in the original language) so as to display the subtitle in the selected language, or, in case of giving audience to a music recorded on the CD, it is not possible to select one of sound voices of the music (e.g., select one of the English lyric and the Japanese lyric).

On the other hand, various proposals and developments are being made as for the DVD, as an optical disk in which the memory capacity is improved by about ten times without changing the size of the optical disk itself as compared with the aforementioned conventional CD. However, a recording technique of the DVD capable of displaying various selection branches to the audience and reproduce precisely, certainly and smoothly the content of the selected record information as in the above explained manner, is not proposed or developed yet. Further, in the technical art of the DVD, the actuality is such that a person having an ordinary skill in this art does not even recognize the subject itself to display various selection branches to the audience, and reproduce precisely, certainly and smoothly the content of the selected record information.

SUMMARY OF THE INVENTION

It is therefore an object of the present invention to provide an information record medium and a recording apparatus for recording record information on the information record medium, which can record the record information such that the record information can be precisely and smoothly reproduced and that variegated reproductions of the record information corresponding to a request of the audience can be performed. It is another object of the present invention to provide a reproducing apparatus for reproducing the record information from the information record medium, which can perform the variegated reproductions precisely and smoothly at a low cost.

The above object of the present invention can be achieved by an information recording apparatus provided with: a signal process device for applying a predetermined signal process, such as the MPEG 2 (Moving Picture Experts Group 2) method and the like, to record information, which is to be recorded onto an information record medium, such as a DVD and the like, and is inputted from the external, to output processed record information, and for dividing control information, which corresponds to the record information and is inputted from the external, into search control information, such as DSI (Data Search Information) and the like, which is information to search a record position of the record information to be reproduced at a time of reproducing the record information from the information record medium, and reproduction display control information, such as PCI (Presentation Control Information) and the like, which is information to control a reproduced display of the record information at the time of reproducing the record information from the information record medium, to output the search control information and the reproduction display control information; a multiplex device, such as a controller, a multiplexer and the like, for multiplexing the processed record information, the search control information and the reproduction display control information outputted from the signal process device to output multiplexed record information; and a record device, such as a mastering device and the like, for recording the multiplexed record information outputted from the multiplex device onto the information record medium.

According to the present invention, the predetermined signal process is applied to the record information, and the processed record information is outputted, by the signal process device. The control information is divided into the search control information and the reproduction display control information, and these informations are outputted by the signal process device. Then, the processed record information, the search control information and the reproduction display control information are multiplexed, and the multiplexed record information is outputted, by the multiplex device. After that, the multiplexed record information is recorded onto the information record medium, by the record device.

Therefore, since the control information is recorded on the information record medium such that the control information is divided into the search control information, such as DSI and the like, and the reproduction display control information, such as PCI and the like, if the information reproducing apparatus for reproducing the record information is equipped with a buffer device, such as a track buffer and the like, having a predetermined delay time, it is possible to extract the search control information before the detected record information is inputted to the buffer device, so as to use the extracted search control information for searching the record information, and it is also possible to extract the reproduction display control information when the record information is outputted from the buffer device, so as to use the extracted reproduction display control information for controlling the reproduced display of the record information.

Thus, at the time of reproducing the record information, it is possible to reproduce the record information precisely and smoothly without the harmful influence of the time delay due to the buffer device, and it is also possible to perform the variegated reproductions on the basis of the search control information and the reproduction display control information.

In one aspect of the information recording apparatus of the present invention, the reproduction display control information includes: a plurality of selection item informations, such as color information, position information, movement information and the like, to respectively select a content of the reproduced display of the record information; and response display operation information, such as high light information and the like. The response display operation information is provided with: reproduction display operation information, such as a command information and the like, indicating an operation for the reproduced display of the record information corresponding to each of the selection item informations; and effective time interval information indicating a time interval during which a selection operation of the content of reproduced display corresponding to each of the selection item informations is effective.

According to this aspect, since the reproduction display control information, such as PCI and the like, includes the response display operation information, such as high light information and the like, it is possible to control the display of the selection item corresponding to the selection item information in accordance with the reproduction of the record information, and it is also possible to make the selection operation of the content of the reproduced display corresponding to the selection item be effective or valid for an arbitrary time interval by use of the effective time interval information.

Thus, at the time of reproducing the record information, it is possible to control the display of the selection item appropriately in accordance with the record information, and it is also possible to perform the variegated reproductions of the record information by precisely performing the selection operation of the content of the record information based on the selection item information.

In another aspect of the information recording apparatus of the present invention, the search control information includes search information, such as VOB (Video OBject) unit search information and the like, which is information to search one detection position on the information record medium, at which the record information to be nextly detected is recorded, from another detection position, at which the record information is presently detected, at the time of reproducing the record information.

According to this aspect, since the search control information includes the search information, such as VOB unit search information and the like, it is possible to obtain the search information before the record information is inputted to the buffer device, such as a track buffer and the like, at the time of reproducing the record information, so that the search of the record information to be nextly detected can be easily performed.

Thus, it is possible to perform the precise and smooth reproduction at the time of reproducing the record information.

In another aspect of the information recording apparatus of the present invention, the reproduction display control information and the search control information are recorded adjacent to each other for each partial record information, which corresponds to the reproduction display control information and the search control information and is a portion of the record information having a predetermined length respectively, and a lower limit value of the predetermined length of the partial record information is prescribed such that a memory capacity of a buffer device, such as a PCI buffer and the like, for temporarily storing the reproduction display control information at the time of reproducing the record information be minimized in correspondence with a delay time required for decoding the partial record information at the time of reproducing the record information.

According to this aspect, it is possible to bundle or gather the control information for each partial record information, e.g., for each VOB unit.

Thus, it is also possible to promote the cost reduction of the information reproducing apparatus by minimizing the memory capacity of the buffer device, such as a PCI buffer and the like, for storing the reproduction display control information.

The above object of the present invention can be also achieved by an information reproducing apparatus for reproducing record information, which is recorded on an information record medium, such as a DVD and the like, such that a predetermined signal process, such as the MPEG 2 method and the like, is applied to the record information. The information reproducing apparatus is provided with: a detection and demodulation device, such as an optical pickup, a demodulate and correct unit and the like, for detecting and demodulating the record information from the information record medium on the basis of a control signal, and outputting a demodulation signal; a search control information extract device, such as a system buffer and the like, for extracting search control information, such as DSI and the like, which is information to search a record position on the information record medium of the record information to be reproduced, from the demodulation signal outputted from the detection and demodulation device; a demodulation signal buffer device, such as a track buffer and the like, for temporarily storing the demodulation signal outputted from the detection and demodulation device, and outputting the stored demodulation signal; a reproduction display control information extract device, such as a demultiplexer and the like, for extracting reproduction display control information, such as PCI and the like, which is information to control a reproduced display of the record information, from the demodulation signal outputted from the demodulation signal buffer device; and a controller, such as a system controller and the like, for outputting the control information on the basis of the extracted search control information, and for controlling the reproduced display of the record information on the basis of the extracted reproduction display control information.

According to the information reproducing apparatus of the present invention, the record information is detected and demodulated from the information record medium on the basis of the control signal, and the demodulation signal is outputted, by the detection and demodulation device, such as an optical pickup, a demodulate and correct unit and the like. Then, the search control information is extracted from the demodulation signal, by the search control information extract device, such as a system buffer and the like. Along with this, the demodulation signal is temporarily stored and is outputted by the demodulation signal buffer device, such as a track buffer and the like. Then, the reproduction display control information, such as PCI and the like, is extracted from the demodulation signal outputted from the demodulation signal buffer device, by the reproduction display control information extract device, such as a demultiplexer and the like. After that, the control information is outputted on the basis of the extracted search control information, and the reproduced display of the record information is controlled on the basis of the extracted reproduction display control information, by the controller, such as a system controller and the like.

Therefore, since the search control information, such as DSI and the like, is extracted before the demodulation signal is inputted to the buffer device such as a track buffer and the like, it is possible to obtain the search control information corresponding to the detection position on the information record medium, at which the detection and demodulation device is detecting, so that the search of the record information to be reproduced can be easily performed. Further, since the reproduction display control information, such as PCI and the like, is extracted after the demodulation signal is outputted from the buffer device, the display control can be performed in correspondence with the timing of actually displaying the record information.

Thus, it is possible to reproduce the record information precisely and smoothly without the harmful influence of the time delay due to the buffer device such as a track buffer and the like, and it is also possible to perform the variegated reproductions on the basis of the search control information and the reproduction display control information.

In one aspect of the information reproducing apparatus of the present invention, the information reproducing apparatus is further provided with an operation information buffer device, such as a high light buffer and the like, for temporarily storing response display operation information, such as high light information and the like. The response display operation information is included in the extracted reproduction display control information, and is provided with: reproduction display operation information, such as command information and the like, indicating an operation for the reproduced display of the record information corresponding to each of a plurality of selection item informations, such as color information, position information, movement information and the like, to respectively select a content of the reproduced display of the record information; and effective time interval information indicating a time interval during which a selection operation of the content of reproduced display corresponding to each of the selection item informations is effective, and outputting the stored response display operation information. The controller controls the selection operation on the basis of the effective time interval information of the response display operation information outputted from the operation information buffer device.

According to this aspect, the response display operation information, such as high light information and the like, which is included in the reproduction display control information, such as PCI and the like, is temporarily stored in the operation information buffer device, such as a high light buffer and the like. Then, the selection operation is controlled, by the controller, on the basis of the effective time interval information included in the response display operation information.

Therefore, it is possible to control the display of the selection item corresponding to the selection item information in accordance with the reproduction of the record information, and it is also possible to make the selection operation of the content of the reproduced display corresponding to the selection item be effective or valid for an arbitrary time interval by use of the effective time interval information.

Thus, it is possible to control the display of the selection item appropriately in accordance with the record information, and it is also possible to perform the variegated reproductions of the record information by precisely performing the selection operation of the content of the record information based on the selection item information.

In another aspect of the information reproducing apparatus of the present invention, the search control information includes search information, such as VOB unit search information and the like, which is information to search one detection position on the information record medium, at which the record information to be nextly detected is recorded, from another detection position, at which the record information is presently detected.

According to this aspect, since the search control information includes the search information, such as VOB unit search information and the like, it is possible to obtain the search information before the record information is inputted to the buffer device, such as a track buffer and the like, so that the search of the record information to be nextly detected can be easily performed.

Thus, it is possible to perform the precise and smooth reproduction.

In another aspect of the information reproducing apparatus of the present invention, the information reproducing apparatus is further provided with a control information buffer device, such as a PCI buffer and the like, for temporarily storing the extracted reproduction display control information and outputting the stored reproduction display control information. The reproduction display control information extract device extracts the reproduction display control information at a predetermined time interval. A lower limit value of the predetermined time interval is prescribed such that a memory capacity of the control information buffer device be minimized in correspondence with a delay time required for decoding a portion of the record information, which is recorded between two successive reproduction display control informations.

According to this aspect, the extracted reproduction display control information is temporarily stored in and outputted from the the control information buffer device, such as a PCI buffer and the like. Then, the reproduction display control information is extracted at the predetermined time interval. Here, the lower limit value of the predetermined time interval is prescribed such that the memory capacity of the control information buffer device, such as a PCI buffer and the like, be minimized in correspondence with the delay time required for decoding the portion of the record information.

Thus, it is possible to promote the cost reduction of the information reproducing apparatus by minimizing the memory capacity of the buffer device, such as a PCI buffer and the like, for storing the reproduction display control information.

The above object of the present invention can be also achieved by an information record medium, such as a DVD and the like, on which record information and control information are recorded and from which the record information is to be reproduced by a reproducing apparatus for controlling a reproduction of the record information on the basis of the control information. The information record medium has a data structure stored in the information record medium and including: processed record information generated by applying a predetermined signal process, such as a MPEG 2 method and the like, to the record information; and the control information multiplexed with the processed record signal and divided into search control information, such as DSI and the like, which is to search a record position on the information record medium of the record information to be reproduced at a time of reproducing the record information therefrom, and reproduction display control information, such as PCI and the like, which is to control a reproduced display of the record information at the time of reproducing the record information therefrom.

According to the information record medium of the present invention, since the control information is divided into the search control information, such as DSI and the like, and the reproduction display control information, such as PCI and the like, if the information reproducing apparatus for reproducing the record information is equipped with a buffer device, such as a track buffer and the like, having a predetermined delay time, it is possible to extract the search control information before the detected record information is inputted to the buffer device, so as to use the extracted search control information for searching the record information, and it is also possible to extract the reproduction display control information when the record information is outputted from the buffer device, so as to use the extracted reproduction display control information for controlling the reproduced display of the record information.

Thus, at the time of reproducing the record information, it is possible to reproduce the record information precisely and smoothly without the harmful influence of the time delay due to the buffer device, and it is also possible to perform the variegated reproductions on the basis of the search control information and the reproduction display control information.

In one aspect of the information record medium of the present invention, the reproduction display control information includes:

a plurality of selection item informations, such as color information, position information, movement information and the like, to respectively select a content of the reproduced display of the record information; and response display operation information, such as high light information and the like. The response display operation information is provided with: reproduction display operation information, such as command information and the like, indicating an operation for the reproduced display of the record information corresponding to each of the selection item informations; and effective time interval information indicating a time interval during which a selection operation of the content of reproduced display corresponding to each of the selection item informations is effective.

According to this aspect, since the reproduction display control information includes the response display operation information, such as high light information and the like, it is possible to control the display of the selection item corresponding to the selection item information in accordance with the reproduction of the record information, and it is also possible to make the selection operation of the content of the reproduced display corresponding to the selection item be effective or valid for an arbitrary time interval by use of the effective time interval information.

Thus, at the time of reproducing the record information, it is possible to control the display of the selection item appropriately in accordance with the record information, and it is also possible to perform the variegated reproductions of the record information by precisely performing the selection operation of the content of the record information based on the selection item information.

In another aspect of the information record medium of the present invention, the search control information includes search information, such as VOB unit search information and the like, which is information to search one detection position on the information record medium, at which the record information to be nextly detected is recorded, from another detection position, at which the record information is presently detected, at the time of reproducing the record information.

According to this aspect, since the search control information includes the search information, such as VOB unit search information and the like, it is possible to obtain the search information before the record information is inputted to the buffer device, such as a track buffer and the like, at the time of reproducing the record information, so that the search of the record information to be nextly detected can be easily performed.

Thus, it is possible to perform the precise and smooth reproduction at the time of reproducing the record information.

In another aspect of the information record medium of the present invention, the reproduction display control information and the search control information are recorded adjacent to each other for each partial record information, which corresponds to the reproduction display control information and the search control information and is a portion of the record information having a predetermined length respectively, and a lower limit value of the predetermined length of the partial record information is prescribed such that a memory capacity of a buffer device, such as a PCI buffer etc., for temporarily storing the reproduction display control information at the time of reproducing the record information be minimized in correspondence with a delay time required for decoding the partial record information at the time of reproducing the record information.

According to this aspect, it is possible to bundle or gather the control information for each partial record information, e.g., for each VOB unit.

Thus, it is also possible to promote the cost reduction of the information reproducing apparatus by minimizing the memory capacity of the buffer device, such as a PCI buffer and the like, for storing the reproduction display control information.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5A is a diagram showing various information included in a DSI data in the embodiment;

FIG. 5B is a diagram showing various information included in a PCI data in the embodiment;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

| | |
|---|---|
| reproduction display control information | PCI (Presentation Control Information) Data |
| search control information | DSI (Data Search Information) data |
| response display operation information | high light information |
| reproduction display operation information | command information |
| selection item informations | color information, position information, movement information |
| search information | VOB (Video OBject) unit search information |
| (demodulation signal) buffer means | track buffer |
| control information buffer means | PCI buffer |
| operation information buffer means | high light buffer |

(I) Embodiment of Information Record Medium

First of all, a physical structure and a logical structure as well as an operation of a DVD, as one embodiment of the information record medium to which the present invention is applied, will be explained with reference to FIGS. 1 to 6.

Figure 1:
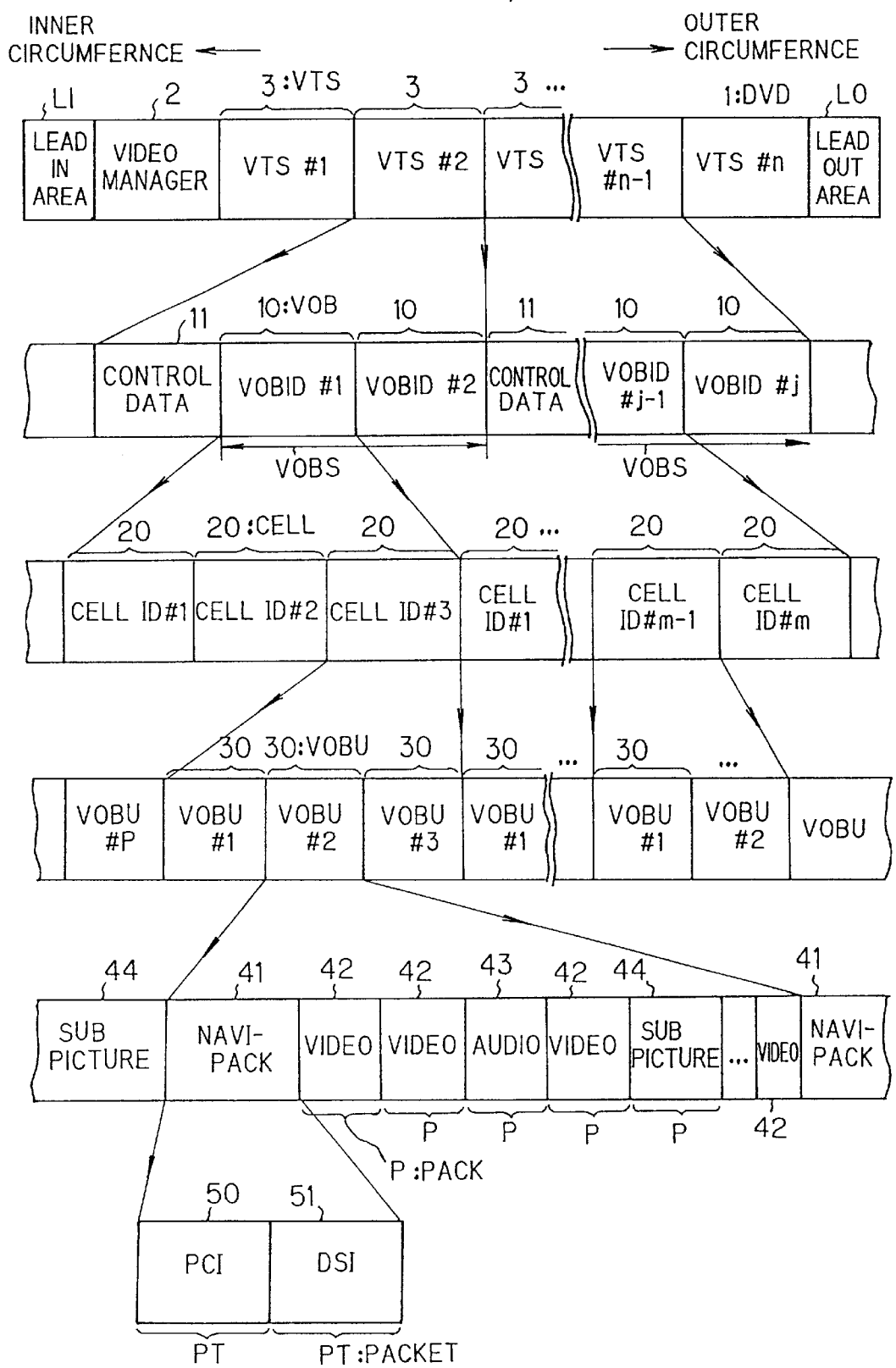
FIG. 1 is a diagram showing a physical structure of record information of a DVD as one embodiment of the present invention.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area L0 at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of the audio information and sub picture information included therein, is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for showing a name of each title, information for preventing an illegal copy, an access table for accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell I D#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41; a video data 42 as the video information; an audio data 43 as the audio information; and a sub picture data 44 as the sub picture information. Here, in a pack P for the video data 42, only the video data is recorded. In a pack P for the audio data 43, only the audio data is recorded. Further, in a pack P for the sub picture data 44, only graphic data of a character, a diagram or the like as the sub picture, is recorded. In the video packs 42, which data amount is relatively large as shown in FIG. 1, one or a plurality of GOPs are recorded within one VOB unit 30. The audio data 43 and the sub picture data 44 are disposed intermittently between the video packs 42. It is prescribed by a standard specification of the DVD that there are 8 kinds of audio recordable on the DVD 1 while 32 kinds of sub picture recordable on the DVD 1.

These data are recorded such that the reproduction time corresponding to one VOB unit 30 (i.e. the reproduction time corresponding to the data recorded between one navi-pack 41 and another navi-pack 41 adjacent to said one navi-pack 41) is not shorter than 0.4 seconds.

Further, there always exists the navi-pack 41 in one VOBU 30 at the head thereof. On the other hand, there may not exist each of the video data 42, the audio data 43 and the sub picture data 44 in one VOBU 30, or, even in case that the packs P for these data exist in one VOBU 30, the number of the packs P and the order of the packs P are freely determined.

Finally, the navi-pack 41 is provided with: a DSI (Data Search Information) data 51 in a packet PT including search information to search a video image or an audio sound desired to be displayed or sound-outputted (concretely, search information such as an address, where the video or audio to be displayed or sound-outputted is recorded, on the DVD 1); and a PCI (Presentation Control Information) data 50 in a packet PT including information related to a display control at a time of displaying the video image or outputting the audio sound, which is searched on the basis of the information of the DSI data 51. Further, all video data 42 included in one VOBU 30 consist of at least one GOP (Group Of Pictures) each having an ID number.

In the PCI data 50, high light information, which defines a display or operation at a time when one selection item is selected out of selection items by the audience, is included. By the high light information, for example, the change of the picture plane display for a selection item as well as the display position to be changed in correspondence with the selection item, on a special picture plane of selection items (i.e. a so-called menu picture plane) for the audience to select, and the command corresponding to the selected item (i.e. a command to be performed in correspondence with the selected item) are set.

Further, the video information to construct and display a frame, a selection button and the like, which is required to construct and display the menu picture plane, is recorded in the sub picture data 44 as the sub picture information.

Information to set a value of a register (memory) in a system controller of a reproducing apparatus described later may be included in the high light information. This point is explained by use of a case where the record information recorded on the DVD 1 is an educational software, for example. Namely, in case of an educational software, there may be a case where a test question is displayed on a display portion, and then, a plurality of answer candidates may be displayed as selection items for the audience to select, by use of the sub picture data 44. At this time, if the selection item corresponding to the correct answer for the pertinent question is selected by the audience, the system controller adds a predetermined point or score corresponding to the correct answer to a value of the predetermined register included in the system controller, by use of the command information corresponding to the selection items respectively in the high light information, while the system controller does not add the point or score if the selection item corresponding to the incorrect answer is selected. After that, making question and answering are repeated for a predetermined number of questions in the same manner. After finishing all of the answers, the system controller refers to the predetermined register to which the points or scores are accumulated, and, according to other command information (e.g. the command in the PGCI), controls the optical pickup to jump to a record position on the DVD 1 where questions etc. at a next study stage are recorded if the value of the total points is larger than a predetermined value which is set in advance, while controls the optical pickup to jump to a record position where a software for reviewing is recorded if the value of the total points is less than the predetermined value. As in the above explained example, it is possible to set the value of the register in the controller by the high light information.

On the other hand, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Figure 2:
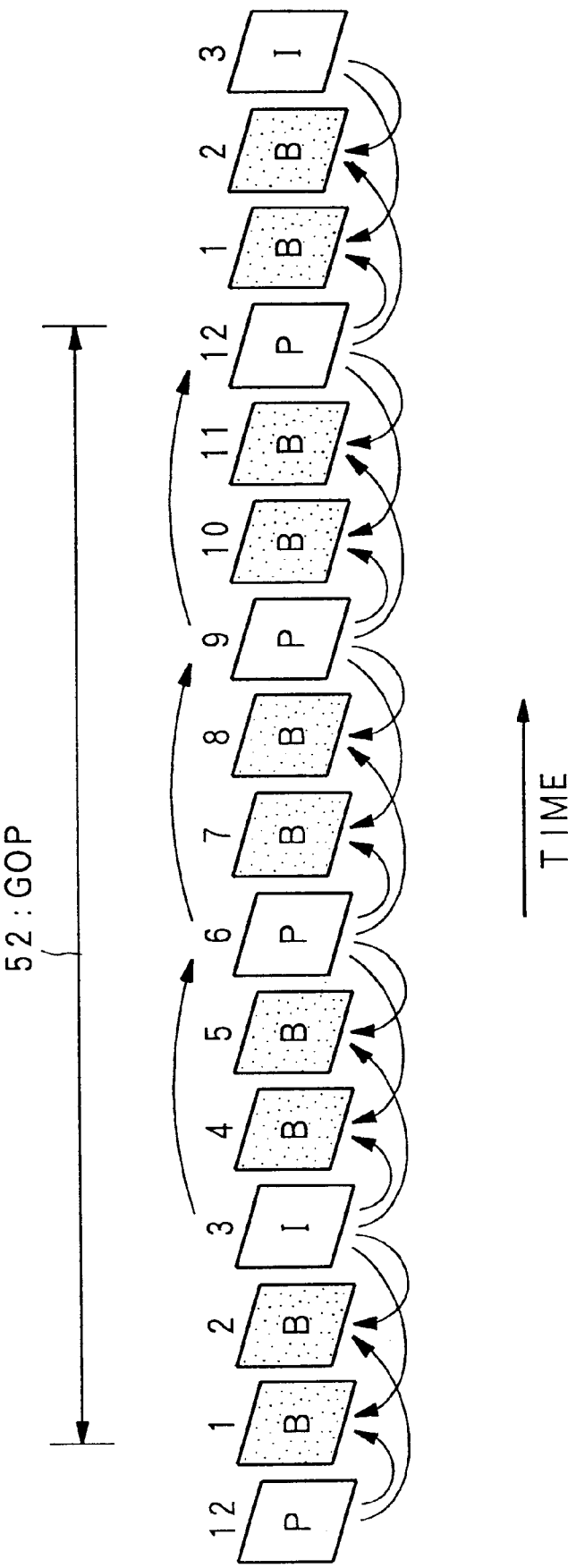
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIG. 1 by combining them (especially combining the cells 20) in the logical structure shown in FIG. 3, is recorded on the DVD 1, especially in the control data 11.

Figure 3:
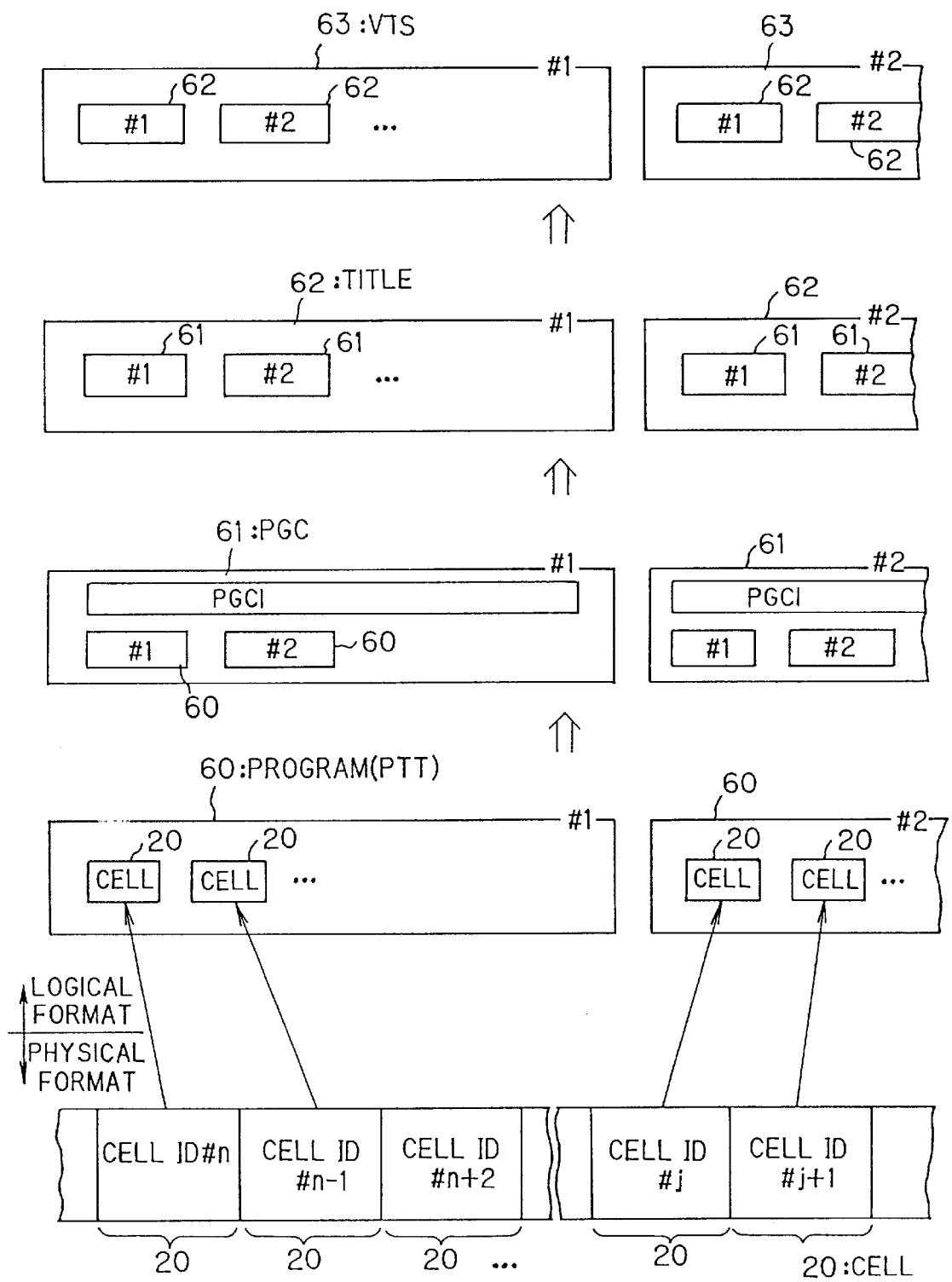
FIG. 3 is a diagram showing a logical structure of the record information of the DVD in FIG. 1.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Figure 4:
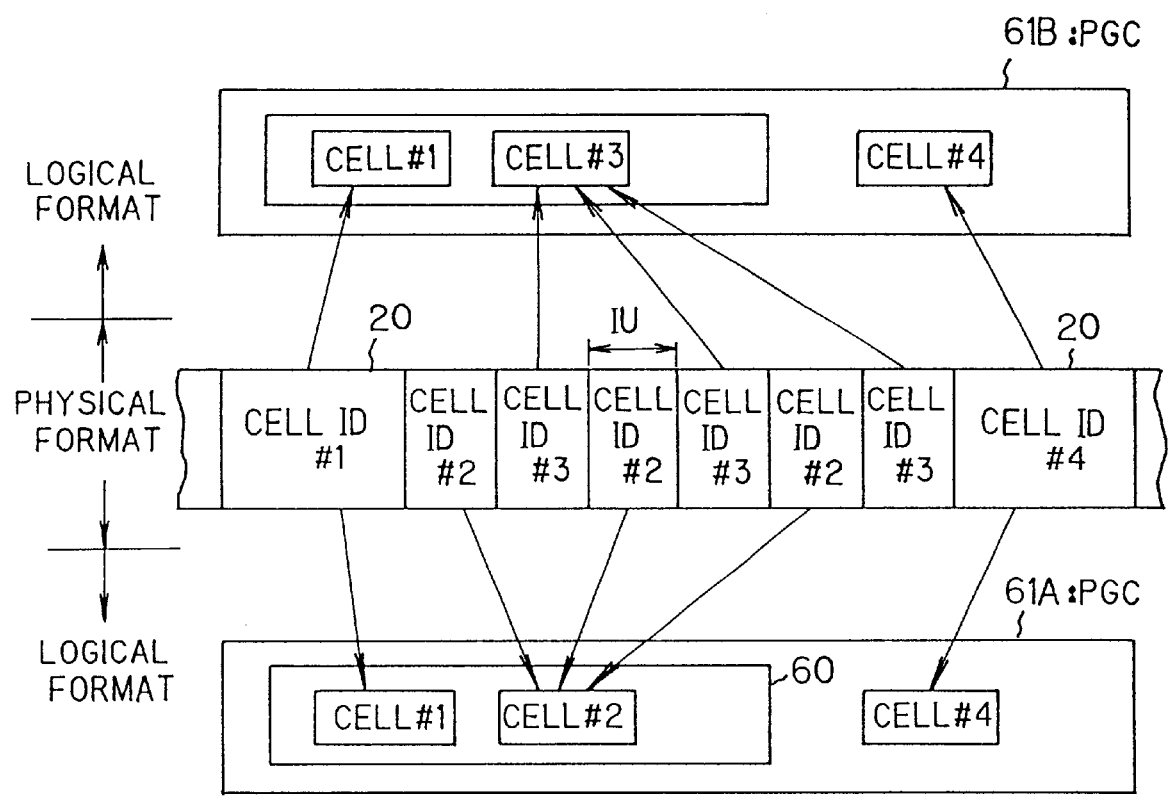
FIG. 4 is a diagram showing a structure of an interleaved unit of the DVD in FIG. 1.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at a track buffer of the reproducing apparatus described later (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Since it is necessary to record the information at various hierarchy classes explained above, the record information having the above explained recording format is suitable for an information record medium having a large memory capacity, such as the aforementioned DVD 1, which memory capacity is so large that audio voices or subtitles in various kinds of languages in addition to the movie itself can be recorded on a single optical disk as for the audio voice or subtitle of the movie.

Nextly, among the video information and the audio information having the above mentioned physical structure and logical structure, the PCI data 50 and the DSI data 51 especially related to the present invention are explained with reference to FIGS. 5A and 5B.

At first, in the DSI data 51, the search information to search the information to be reproduced and displayed, more concretely, the information to search the video, audio or sub picture to be reproduced and displayed by the unit of the aforementioned VOB unit 30, the information to perform the aforementioned seamless reproduction, and the information to search the audio or sub picture synchronized with the video, are recorded or described as aforementioned.

These informations are classified as following.

(1) information to set a timing of each constitutional element in the reproducing apparatus described later, at a time of starting a certain operation specified by the audience (2) information to recognize a position on the DVD 1, which corresponds to the data division on the logical structure shown in FIG. 3, of the optical pickup of the reproducing apparatus described later (3) information to write only the data to be reproduced and displayed into a track buffer of the reproducing apparatus described later (4) information to indicate a record position (i.e. a target or destination position) on the DVD 1 of the data to be accessed (detected)

(5) protection information to protect the other data etc., if a desired data address cannot be searched at a time of searching the data for accessing.

Nextly, it is explained with reference to FIG. 5A, how to concretely record each of the above mentioned informations in the DSI data 51, to which the information classified in the above mentioned manner are to be recorded.

As shown in FIG. 5A, more concretely, the DSI data 51 is provided with: general information which is commonly used within one DSI data 51; seamless information to perform the seamless reproduction; angle jump destination information to perform an angle reproduction explained later; VOB unit search information to search a desirable VOB unit 30; and synchronous reproduction information which is the information related to the sub picture data 44 and audio data 43 to be reproduced and displayed in synchronization with the VOB unit 30 including the pertinent DSI data 51.

Here, the angle reproduction is explained in which the above mentioned angle jump destination information is applied. In the DVD 1 of the present embodiment, it is possible to record the video information of one scenery from a plurality of view points on a same time axis as for one movie (title 62), for example. Namely, more concretely, it is possible to record the video image of a scenery from a view point of an actor acting in the movie, and also record a video image of the same scenery from a view point of an actress acting in the movie. Then, these video images may be reproduced while exchanging these video images according to a selection by the audience, by an input operation during watching and listening to it, for example, which is called as an "angle change (or switch) reproduction".

Each information shown in FIG. 5A is explained in more detail. The general information includes: time information to set a reproduction start timing of each constitutional element of the reproducing apparatus described later, as for a certain operation specified by the audience; a record position (e.g. a logical address) on the DVD 1 of each data to construct the logical structure shown in FIG. 3; protection information to protect, if the address of the desired data cannot be detected at the time of data search, other data etc.; and time information to perform a time search operation of the reproducing apparatus described later (e.g. elapse time information indicating an elapse time in the cell 20).

The seamless information includes: information indicating a record position (e.g. a logical address) on the DVD 1 of each data required for the seamless reproduction; and time information to set in advance the timing of connecting reproduced picture planes respectively in the seamless reproduction.

Further, the angle jump destination information includes address information indicating a record position on the DVD 1 of data to be reproduced so as to perform the angle change reproduction in the seamless manner (i.e. in the continuous manner) when changing the angle.

The VOB unit search information includes address information indicating a record position on the DVD 1 of the other VOB unit 30 to be reproduced, which is positioned in a predetermined area at the vicinity of the pertinent DSI data 51 (i.e. a record position of the other DSI data 51).

Finally, the synchronous reproduction information includes address information indicating a record position on the DVD 1 of the sub picture data 44 or the audio data 43 to be reproduced in synchronization with the VOB unit 30 including the pertinent DSI data 51.

By use of the DSI data 51 including each of the above described informations, the processes such as the time search operation etc., can be performed by the reproducing apparatus described later.

Nextly, the PCI data 50 related to the present invention is explained with reference to FIG. 5B.

The PCI data 50 includes reproduction display control information to reproduce and display the information searched on the basis of the DSI data 51 as described above, i.e. the information to control changing of the display content in synchronization with the reproducing condition of the video data 42, the audio data 43 and the sub picture data 44 in the VOB unit 30, which are searched on the basis of the DSI data 51.

These informations in the PCI data 50 are classified as following.

(1) reproduction display control information as for the video, audio and sib picture which are being actually displayed (2) output information of each data (3) information related to a so called user interface with the audience Nextly, it is explained with reference to FIG. 5B, how to record concretely each of the informations in the PCI data 50 in which the above classified informations are recorded.

As shown in FIG. 5B, the PCI data 50 is concretely provided with: general information commonly used in one PCI data 50; angle jump destination information to perform the angle change reproduction in a non-seamless manner; and the aforementioned high light information.

Here, the angle change reproduction in the non-seamless manner is explained. Namely, the angle jump destination information included in the DSI data 51 (in FIG. 5A) is applied to the angle change reproduction in the seamless manner, in which the video image is not stopped or discontinued at the time of changing or switching the scenery in the angle change reproduction. The angle change reproduction in the non-seamless manner, to which the angle jump destination information in the PCI data 50 (in FIG. 5B) is applied, is an angle change reproduction, in which the video image is temporarily stopped at the time of switching or changing the scenery, and in which the angle is changed or switched by jumping the optical pickup to a record position on the DVD 1 where the video to be nextly reproduced is recorded while the video image is being stopped. Although the angle can be continuously changed in the aforementioned seamless angle change reproduction, the changing is performed after the track buffer of the reproducing apparatus described later is filled up with the reproduced data by reproducing the data until a predetermined record position on the DVD 1, so as to guarantee the continuity upon angle changing. Thus, the time delay may be generated at the time of changing the angle according to the seamless angle change reproduction. On the contrary to this, although the video image is temporarily stopped at the time of changing the angle in the non-seamless angle change reproduction, it has a characteristic that the time delay is not generated upon changing the angle.

The informations shown in FIG. 5B are further explained. The general information includes: information related to the attribute of the VOB unit 30, in which the pertinent PCI data 50 is recorded; information related to the reproduction display control of the pertinent VOB unit 30; and information related to the permission or prohibition of the user interface as for a certain operation specified by the audience.

The angle jump destination information includes: address information indicating the record position on the DVD 1 of the data to be reproduced for performing the angle change reproduction by changing the angle in the non-seamless manner.

The high light information includes: effective time interval information indicating an effective time interval during which the selection button displayed on the menu picture plane etc. can be effectively operated in correspondence with each selection branch for the audience to select (which is defined as start and end times of the effective time interval, and which may be set effective over a plurality of VOB units 30); color information to display the color of the selection button with changing the color on the basis of the selecting operation by the user; position information indicating the display position corresponding to the selection button; movement information indicating the movement destination when the movement operation of a cursor indicating that the selection button is selected is performed on the basis of the selecting operation by the audience; and command information corresponding to each selection button and indicating the operation to be performed when the selection button is selected (e.g. information to set the register in the system controller as aforementioned).

As for this high light information in more detail, the information recorded in the high light information is related to a selection button displayed by use of the data recorded in the sub picture data 44, and the selection branches corresponding to the selection items are displayed such that they are superimposed on the video image displayed on the basis of the video data 42 (which is included in the VOB unit 30).

Figure 6:
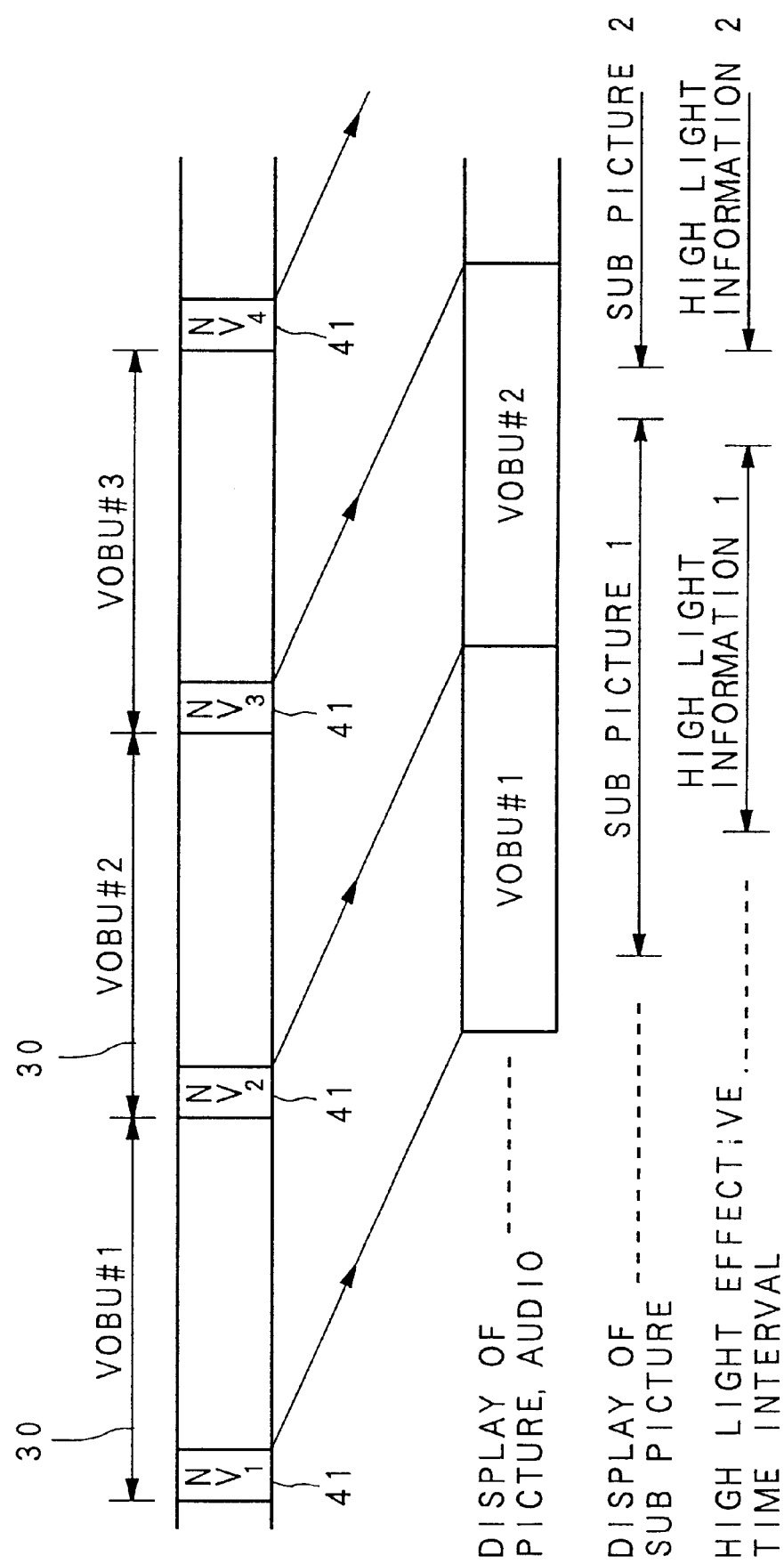
FIG. 6 is a diagram showing high light information.

Therefore, there may be a case where the selection button is successively displayed even if the video image is updated, and where it is necessary to determine the time interval, during which the operation selected by the selection button is effective (i.e., a case where the time interval, during which the VOB unit 30 corresponding to the high light information is displayed, and the effective time interval of the selection of the selection button based on the high light information are different from each other). Thus, the present embodiment is constructed such that the effective time interval information is stored which indicates the effective time interval, during which the selection button can effectively perform the selection operation, in the high light information, so that one high light information may be made effective with striding over a plurality of VOB units 30, as shown in FIG. 6.

In order to utilize the high light information having the information independent from the video image as described above, the high light information is separated from the pertinent PCI data 50 by a decoder for decoding the PCI data 50, and is decoded by an exclusive high light decoder in the reproducing apparatus described later.

By use of the PCI data 50 including various informations explained above, the processes such as the non-seamless angle change reproduction, the selection operation by the menu picture plane corresponding to the high light information and so on, can be performed by the reproducing apparatus described later.

(II) Embodiment of Recording Apparatus

Next, an embodiment of recording apparatus for recording the above mentioned control information, video information and audio information onto the DVD 1 will be explained with reference to FIG. 7.

Figure 7:
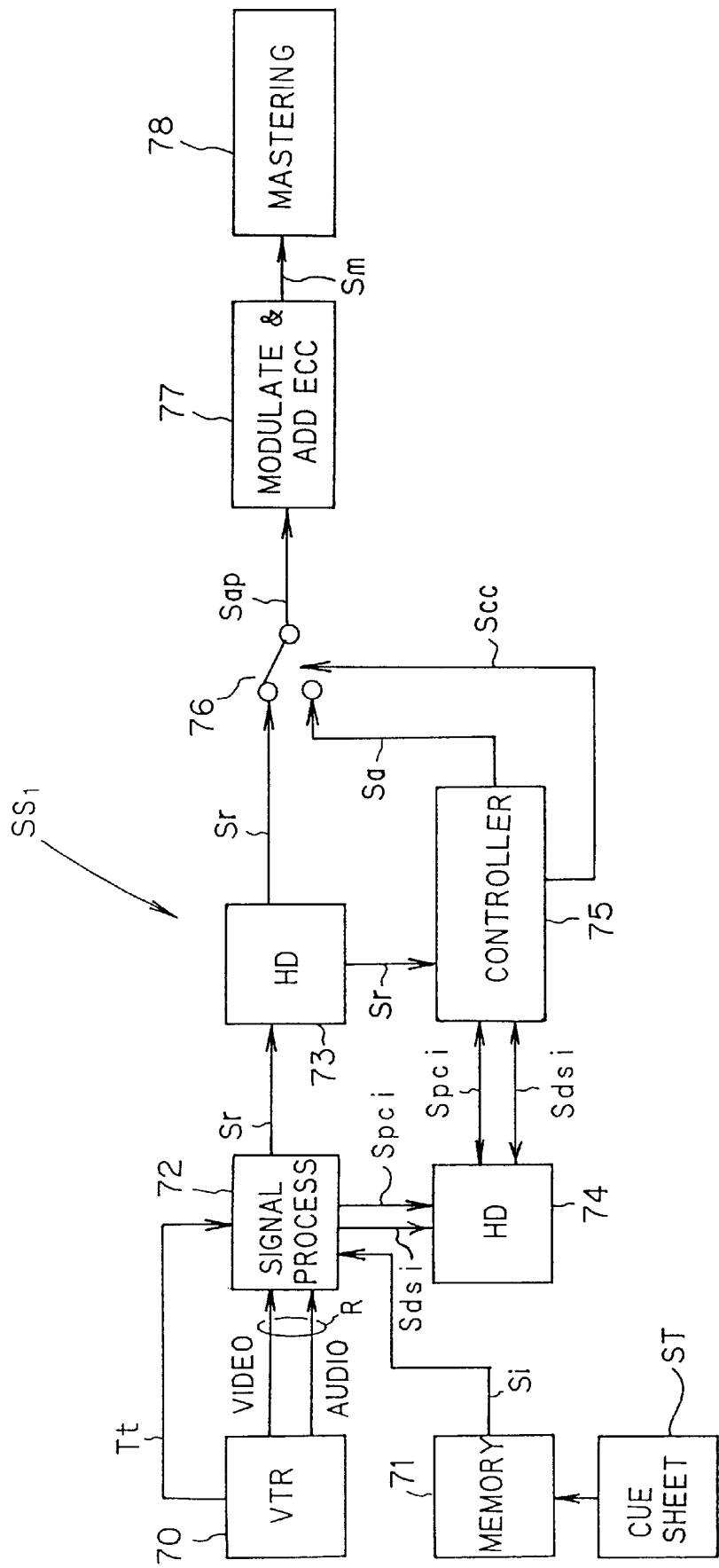
FIG. 7 is a block diagram of a recording apparatus as one embodiment of the present invention.

As shown in FIG. 7, a recording apparatus SS1 as the present embodiment is provided with: a VTR (Video Tape Recorder) 70; a memory 71; a signal process unit 72; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores control information related to the partial record information Pr which is inputted beforehand on the basis of a cue sheet ST, on which the control information for controlling the reproduction of the record information R (e.g. the video manager 2, the control data 11, and the navi-pack 41 including the PCI data 50 and the DSI data 51) are written. Then, the memory 71 outputs it as a control information signal Si on the basis of a request from the signal process unit 72.

Then, the signal process unit 72 separates or extracts the PCI data 50 and the DSI data 51 from the control information with referring to a time code Tt, and outputs them as respectively corresponding PCI data signal Spci and DSI data signal Sdsi, on the basis of the time code Tt corresponding to the record information R outputted from the VTR 70 and the control information signal Si outputted from the memory 71. Then, the PCI data signal Spci and DSI data signal Sdsi are temporarily stored in the hard disk device 74. At this time, control informations other than the PCI data 50 and the DSI data 51 are, although they are not illustrated in FIG. 7, also respectively separated or extracted by the signal process unit 72 in the same manner as the PCI data 50 and the DSI data 51, and are stored into the hard disk device 74.

The above described processes are performed with respect to the whole record information R.

When the above described processes are finished as for the whole record information R, the controller 75 reads out the compressed multiplexed signal Sr from the hard disk device 73, reads out the PCI data signal Spci and the DSI data signal Sdsi as well as other control informations from the hard disk device 74, generates additional information DA, which includes independently each of the PCI data 50, the DSI data 51 and the other control informations, on the basis of these read out signals, and temporarily stores the additional information DA into the hard disk device 74. This is because there may be control information, which content is determined in dependence upon a generation result of the compressed multiplexed signal Sr among various control informations.

On the other hand, the controller 75 performs a time management for each of the operations of the signal process unit 72, the hard disk device 73 and the hard disk device 74, and reads out the additional information DA, which includes the PCI information signal Spci and the DSI information signal Sdsi, from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are read out from the hard disk device 73 or 74 on the basis of the information selection signal Scc from the controller 75, and are time-axis-multiplexed by the multiplexer 76 to be outputted as an information added compressed multiplexed Sap. The information to be recorded at the stage of this information added compressed multiplexed signal Sap has the physical structure (physical format) as shown in FIG. 1, as the control information, the video information and the audio information are multiplexed by the switching operation by use of the information selection signal Scc of the controller 75. And that, the PCI data 50 and the DSI data 51 are independently included in the navi-pack 41 respectively.

If there exists the sub picture information to be recorded in the informations to be recorded, it is inputted, by other means such as a hard disk device not illustrated, to the signal process unit 72, so that it is processed in the same manner as the video and audio information thereat, so that it is included in the information added compressed multiplexed signal Sap.

After that, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

As described above, according to the recording apparatus SS1 of the present embodiment, since the PCI data 50 and the DSI data 51 are separated to be recorded, it is possible to extract the DSI data 51 and use it to search the record information R before the reproduced record information R is inputted to the track buffer, which is to absorb the influence of the variable rate onto the reproduction or to perform the seamless reproduction, in the reproducing apparatus for reproducing the record information R, which is compressed and recorded by means of the variable rate method. At the same time, it is possible to extract the DSI data 50 and perform the reproduction display control based on it corresponding to the record information R, when the record information is outputted from the track buffer.

Since the PCI data 50 includes the high light information and since the high light information includes the effective time interval information indicating the time interval during which the content selecting operation by use of the menu picture plane etc. is effective, it is possible to control the display of the selection items in correspondence with the reproduction of the record information R, and it is possible to make the selecting operation effective for an arbitrary time interval by means of the high light information.

Furthermore, since the DSI data 51 includes the VOB unit search information indicating the record position (target position) on the DVD 1 of the data to be accessed (detected), it is possible to obtain the VOB unit search information indicating the target position before being inputted to the track buffer at the time of reproducing the record information R, so that the search of the record information R to be detected can be easily performed.

(III) Embodiment of Reproducing Apparatus

Next, an embodiment of reproducing apparatus for reproducing the information recorded on the DVD 1 by the above mentioned recording apparatus SS1 will be explained with reference to FIGS. 8 to 13.

At first, a construction and an operation of the reproducing apparatus as the embodiment is explained with reference to FIG. 8.

Figure 8:
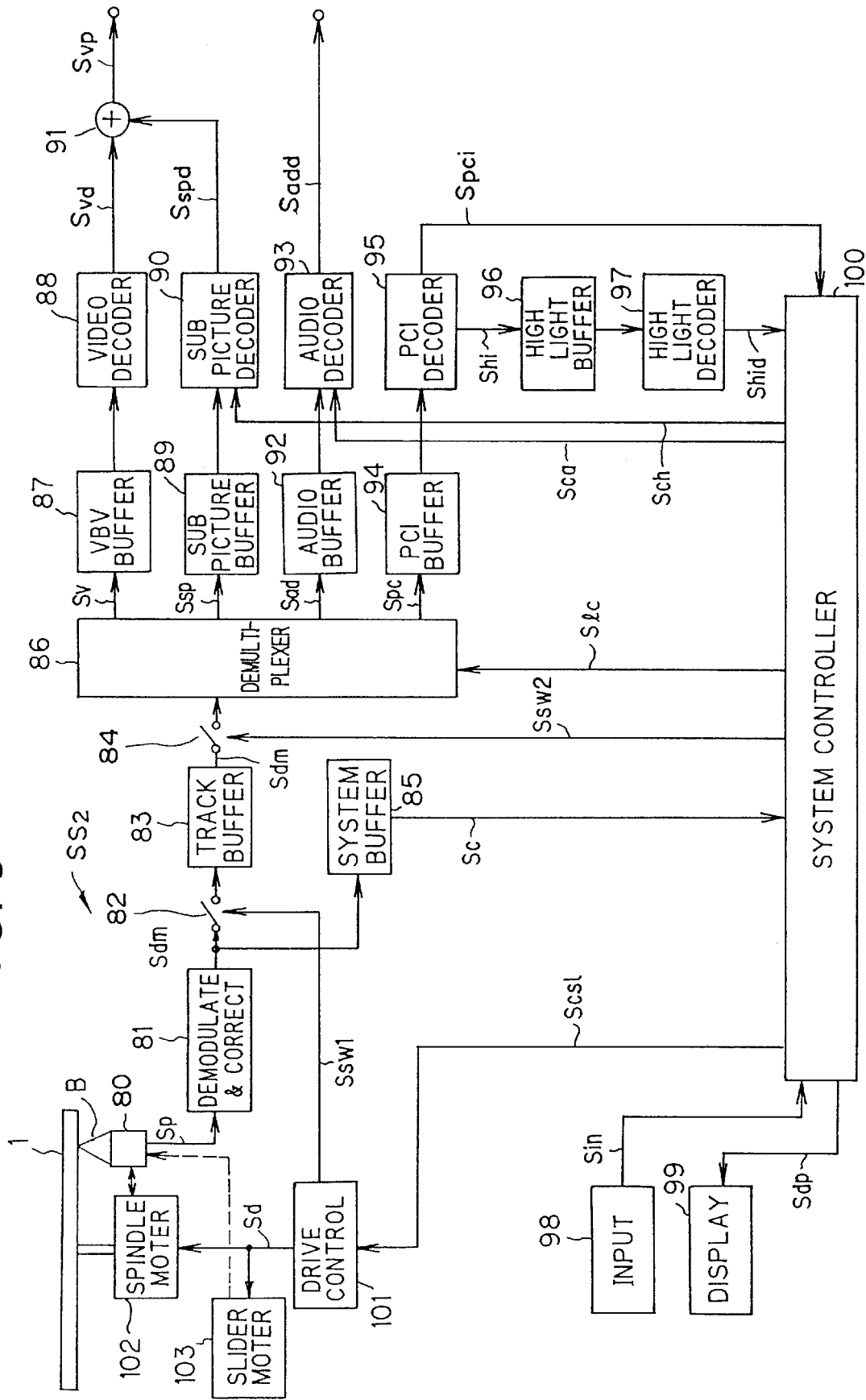
FIG. 8 is a block diagram of a reproducing apparatus as another embodiment of the present invention.

As shown in FIG. 8, a reproducing apparatus SS2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91: an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 8 only illustrates the portions related to the video and audio reproduction of the reproducing apparatus SS2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the control information which is detected firstly upon loading the DVD 1 and which is related to the whole information recorded on the DVD 1 (e.g. the video manager 2 etc.), the control data 11 of the VTS 3 and the like (refer to FIG. 1). Then, the system buffer 85 outputs the accumulated data as one portion of a control information Sc to the system controller 100, and temporarily stores the DSI data 51 for each navi-pack 41 (refer to FIG. 1) while reproducing the information, to output it as another portion of the control information Sc.

The demultiplexer 86, to which the demodulation signal Sdm is continuously inputted through the stream switch 84, separates the video data 42, the audio data 43, the sub picture data 44 and the PCI data 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio data 43 or the sub picture data 44 in a plurality of different languages are included as the audio or sub picture information. In that case, a desirable language is selected for the audio or sub picture information by a stream selection signal S1c from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method (refer to FIG. 2). Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture data 44 included in the sub picture signal Ssp with the video data 42 corresponding to the sub picture data 44, and to output it. Then, the sub picture signal Ssp synchronized with the video data 42 is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to a speaker etc. not illustrated. If it is detected by the system controller 100 that it is necessary to temporarily stop (pause) the audio voice in the reproduction immediately after accessing the desired information, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI data 50, which is included in the PCI signal Spc, with the video data 42, the audio data 43 and the sub picture data 44 corresponding to the PCI data 50, and apply the PCI data 50 to the video data 42, the audio data 43 and the sub picture data 44. Then, from the PCI signal Spc, which is synchronized with the corresponding the video data 42, the audio data 43 or the sub picture data 44 by the PCI buffer 94, high light information included in the PCI data 50 is separated or extracted by the PCI decoder 95, and is outputted as a high light signal Shi to the high light buffer 96. The portion of the PCI data 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. The information to set the value of the register in the system controller 100 is included in this decoded high light signal Shid.

Here, the system controller 100 outputs the aforementioned high light control signal Sch to change the display condition by the high light information, on the basis of the decoded high light signal Shid. At this time, the system controller 100 receive the selecting operation by the input signal Sin from the input unit 98, so as to make effective or valid the selecting operation by use of the menu picture plane based on the high light information on the basis of the effective time interval information, which indicates the effective time interval of the high light information included in the decoded high light signal Shid, and outputs the aforementioned high light control signal Sch.

Further, on the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, a stream selection signal (e.g. a language selection signal) S1c, the pause signal Sca and the high light control signal Sch to correctly perform the reproduction corresponding to those input signals, and also outputs a display signal Sdp to display an operation condition etc. of the reproducing apparatus SS2 to the display unit 99 such as the liquid crystal device.

Furthermore, the system controller 100 outputs a seamless control signal Scs1 corresponding to the track jump process, to the drive controller 101, when it detects by the DSI information signal Sdsi (in the control signal Sc) etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 8), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Figure 9:
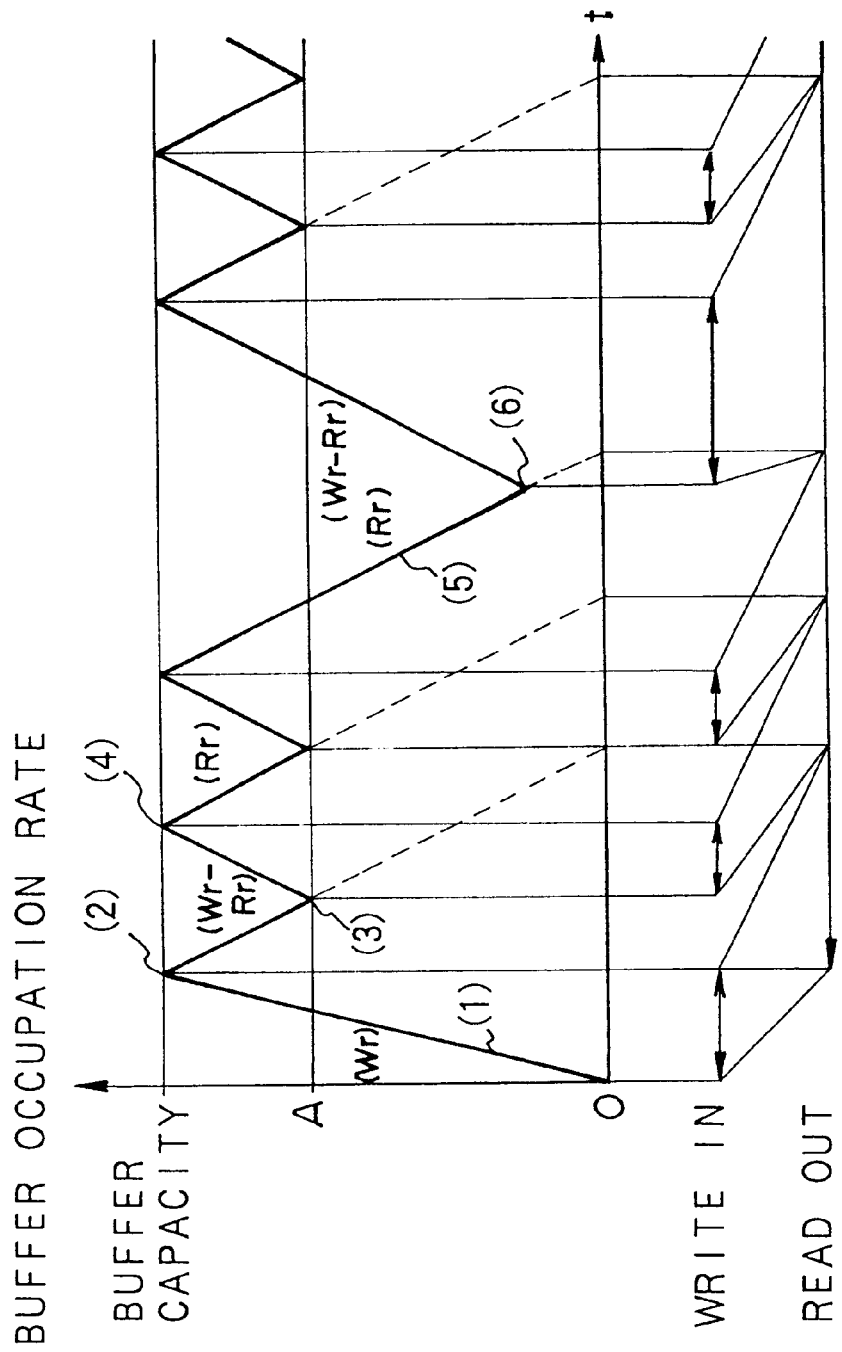
FIG. 9 is a diagram showing an operation of a track buffer of the embodiment in FIG. 8.

The operation of the track buffer 83 in the reproducing apparatus SS2 is especially explained with reference to FIG. 9. FIG. 9 is a graph showing the change of the used information amount versus time of the track buffer 83 (i.e. the occupation amount) at writing in and reading out operations. In FIG. 9, a reference sign Wr represents a writing in rate of writing the information into the track buffer 83, while a reference sign Rr represents a reading out rate of reading out the information from the track buffer 83. In general, a following expression is affirmed.

$$Wr > Rr$$

As discussed above, the track buffer 83 operates as a FIFO memory to compensate the variable data rate in the MPEG 2 method, output the demodulation signal Sdm continuously, which is inputted discontinuously due to a track jump in the seamless reproduction etc., and dissolves stopping of the reproduction due to this discontinuity.

In FIG. 9, when the writing in operation of the demodulation signal Sdm to thetrack buffer 83 is performed (point (1) in the graph), the buffer occupation rate of the track buffer 83 is increased. This writing in operation is performed by closing the stream switch 82.

Then, when the track buffer 83 is occupied to its maximum capacity (point (2)), the stream switch 82 is opened to temporarily stop writing in so as to prevent the over-flow of the track buffer 83, and the stream switch 84 is closed so as to start reading out. Then, when the buffer occupation rate is decreased to be a predetermined occupation rate A, which is set in advance so as to prevent the under-flow of the track buffer 83 (i.e. the condition where the track buffer 83 is empty and it is not possible to read out the demodulation signal Sdm therefrom), the stream switch 82 is closed, so that the writing in operation is restarted by the writing in rate Wr ( point (3)), while it is continued to read out the demodulation signal Sdm from the track buffer 53 at the reading out rate Rr. The increasing rate of the buffer occupation amount is equal to (Wr–Rr).

Then, when the track buffer 83 is occupied up to its maximum capacity again (point (4)), the writing in operation is temporarily stopped, and only the reading out operation is performed (by the reading rate Rr).

After this, as these operations are repeated, the writing in operation to the track buffer 83 is intermittently performed while the reading out operation is continuously performed as shown in a lower portion of FIG. 9. At this time, the value of the reading out rate Rr can be set to be any value as long as it is smaller than the writing in rate Wr, and it is not necessary to fix the reading out rate Rr constant. Thus, in correspondence with the data amount per unit time of the demodulation signal Sdm detected by the variable rate under the MPEG 2 method, the reading out rate Rr may be set relatively high if this data amount per unit time is large, while the reading out rate Rr may be set relatively low, if the data amount per unit time is small.

In case that the optical pickup is jumped in order to perform the data search operation, even if the time required for writing into the track buffer 83 is prolonged (point (5)), it is possible to prevent the reading out operation from being stopped by starting the writing in operation before the occupation amount reaches to zero (point (6)). Depending upon the capacity of the track buffer 83, the length of the interleaved unit IU (refer to FIG. 4) is set such that the reading out operation from the track buffer 83 may not be stopped even if the writing in operation to the track buffer 83 is stopped for a certain time interval due to the track jump over the interleave unit.

Here, although the start of reading out the data is set at a time after the track buffer 83 is occupied to its maximum occupation amount, it is not limited to this. Instead, reading out may be started at a time before the occupation amount reaches its maximum, or reading out and writing in may be started simultaneously.

By the above explained action of the track buffer 83, the seamless reproduction can be performed in correspondence with the record information R by the variable rate method. Namely, the seamless reproduction or the reproduction in the variable rate method can be performed by connecting and continuously outputting the data written discontinuously, by use of the track buffer 83.

In the above explanations for the track buffer 83, the reading out operation of the data is continuous while the reading out rate Rr is variable. However, it is not limited to this. Instead, by intermittently performing the reading out operation of the data by a predetermined high rate Rh (Rh> "the maximum value of Rr") and by controlling or adjusting the length of the time interval during which the data is actually being read out, it is possible to deal with the variable rate method. Even this case is equivalent to a case where the reading out operation is continuously performed, in average by changing the reading out rate Rr. At this time, the smoothing of the data, which is read out intermittently, may be performed by each buffer at the posterior stage of the demultiplexer 86.

Here, as clearly understood from FIG. 9, the difference between the input time and the output time of one data at the track buffer 83 i.e. the delay time at the track buffer 83 is not constant but is changed greatly due to the reading out rate Rr. Further, even if a predetermined search operation is performed, since the data is continuously outputted, it is necessary to increase the buffer capacity of the track buffer 83 itself. Therefore, the delay time is inevitably prolonged.

At this time, assuming that the PCI data 50 and the DSI data 51 are not separated but are detected in one body at a prior stage of the track buffer 83, and that the control is made on the basis of these detected data, it would be difficult as for the control of the reproduction and display, to match the data, which is actually reproduced and displayed (i.e. the data output from the track buffer 83), and the timing of the PCI data 50, since the delay time is not constant at the track buffer 83, resulting in that the correct reproduction and display control would be difficult. On the other hand, assuming that the PCI data 50 and the DSI data 51 are detected in one body at the posterior stage of the track buffer 83, and that the control is made on the basis of these detected data, it would be difficult as for the data search to correlate the position of the optical pickup 80 (which is moved forward by an amount corresponding to the delay time of the track buffer 83) for the search with the DSI data 51 since the delay time of the track buffer 83 is not constant, resulting in that the correct search control would be difficult.

Therefore, in the present embodiment, by separating and recording the PCI data 50 and the DSI data 51, it is possible to perform the search control by extracting the DSI data 51 before the demodulation signal Sdm is inputted to the track buffer 83, while recognizing the position of the optical pickup 80 on the DVD 1, in the reproducing apparatus SS2. Further, it is possible to perform the reproduction and display control in correspondence with the video, audio or sub picture to which the display and reproduction control is performed, by extracting the PCI data 51 after the track buffer 83 outputs the demodulation signal Sdm.

Figure 10:
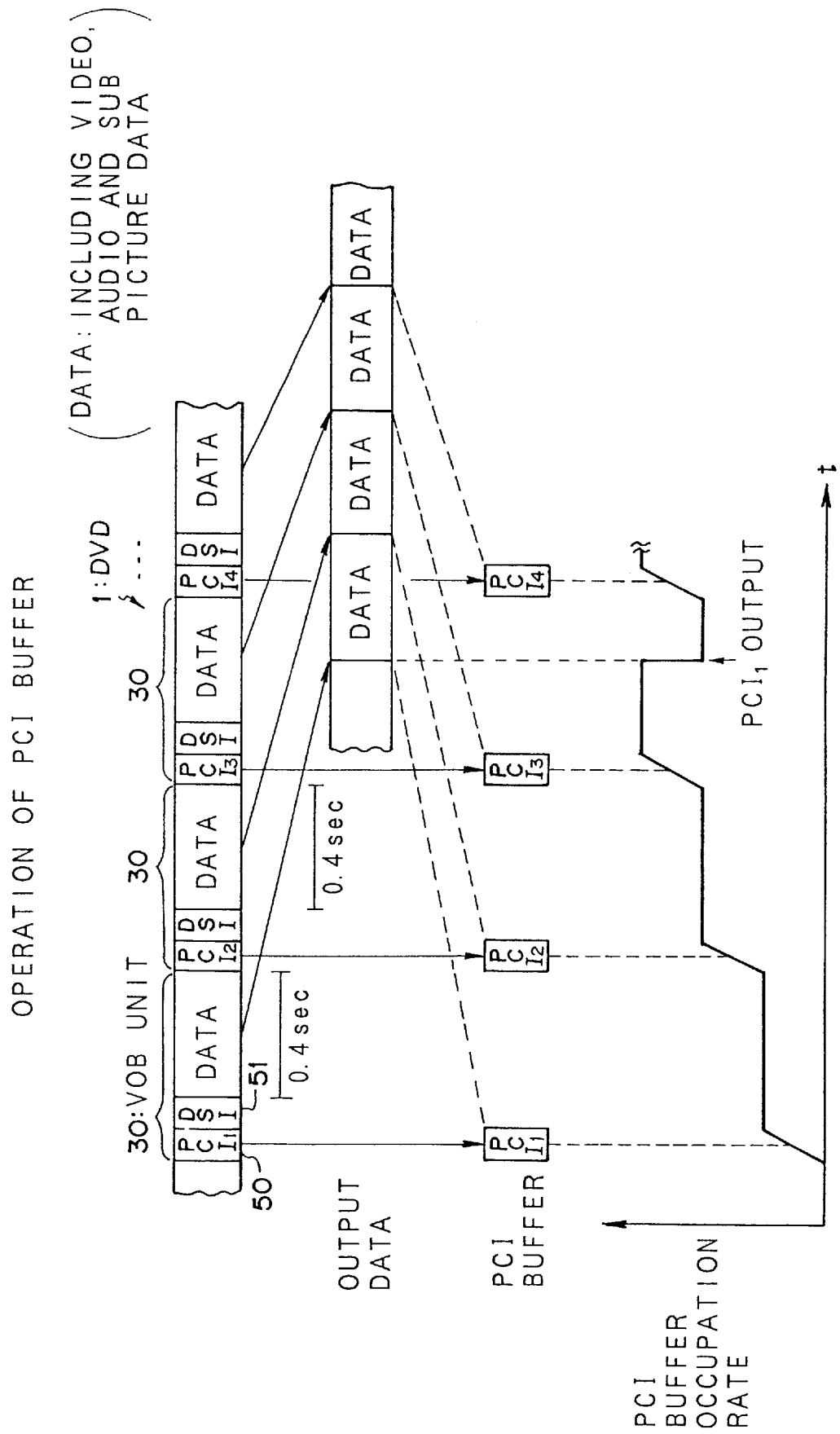
FIG. 10 is a diagram showing an operation of a PCI buffer of the embodiment in FIG. 8.

Nextly, the operation of the PCI buffer 94 is explained with reference to FIG. 10.

As explained before, the PCI buffer 94 is to synchronize the PCI data 50 with the video data 42, the audio data 43, the sub picture data 44 or the like corresponding to the pertinent PCI data 50, so as to apply the PCI data 50 to the video data 42, the audio data 43, the sub picture data 44, or the like.

Therefore, it is necessary that the PCI buffer 94 holds the inputted PCI data 50 until the decoding operations for the video signal Sv etc. corresponding to the PCI data 50 included in the PCI signal Spc, which is inputted to the PCI buffer 94, are respectively finished by the video decoder 88, the sub picture decoder 90 and the audio decoder 93 shown in FIG. 8, and that the PCI buffer 94 outputs the held PCI data 50 to the PCI decoder 95 when the decoding operations for the video signal Sv etc. are respectively finished. From this analysis, as the memory capacity of the PCI buffer 94, a memory capacity enough to hold all of pieces (i.e. the packets PTs in FIG. 1) of the PCI data 50 independently, which are successively inputted thereto until the decoding operations for the video signal Sv etc. are respectively finished.

By the way, it is prescribed by the MPEG 2 standard that the delay time due to the decoding operation of the video signal Sv etc., is 1 second at the maximum, and that the whole decoding operation is completed within 1 second. Therefore, as the maximum memory capacity of the PCI buffer 94, the memory capacity enough to store all of the successive pieces (the packets PTs) of the PCI data 50 independently (more particularly, for each unit of the packet PT for storing the PCI data 50 as shown in FIG. 1), which are inputted within 1 second is required.

Therefore, in the present embodiment, the lower limit value of the reproduction time period corresponding to the data recorded between the two adjacent navi-packs 41 is set to 0.4 second as explained before, and the number of the pieces (the packets PTs) of the PCI data 50, which are inputted to the PCI buffer 94 while the video signal Sv etc. are respectively being decoded, is set to "3" at the maximum. By setting like these, as shown in FIG. 10, even if it takes the maximum time period to decode the video signal Sv etc. and the actually outputted data is delayed by 1 second, the number of the pieces (the packets PTs) of the PCI data 50 which are inputted into the PCI buffer 94 during this time period (i.e. the PCI data 50 represented as a PCI 1, a PCI 2 and a PCI 3 in FIG. 10) is not more than "3". Therefore, as the memory capacity of the PCI buffer 94, the memory capacity corresponding to the data amount of 3 pieces (i.e. 3 packets PTs) of the PCI data 50, so that the miniaturization of the PCI buffer 94 is promoted and the low cost thereof can be realized.

Nextly, some examples of the operations of the reproducing apparatus SS2, which actually uses the PCI data 50 and the DSI data 51, are concretely explained.

Figure 11:
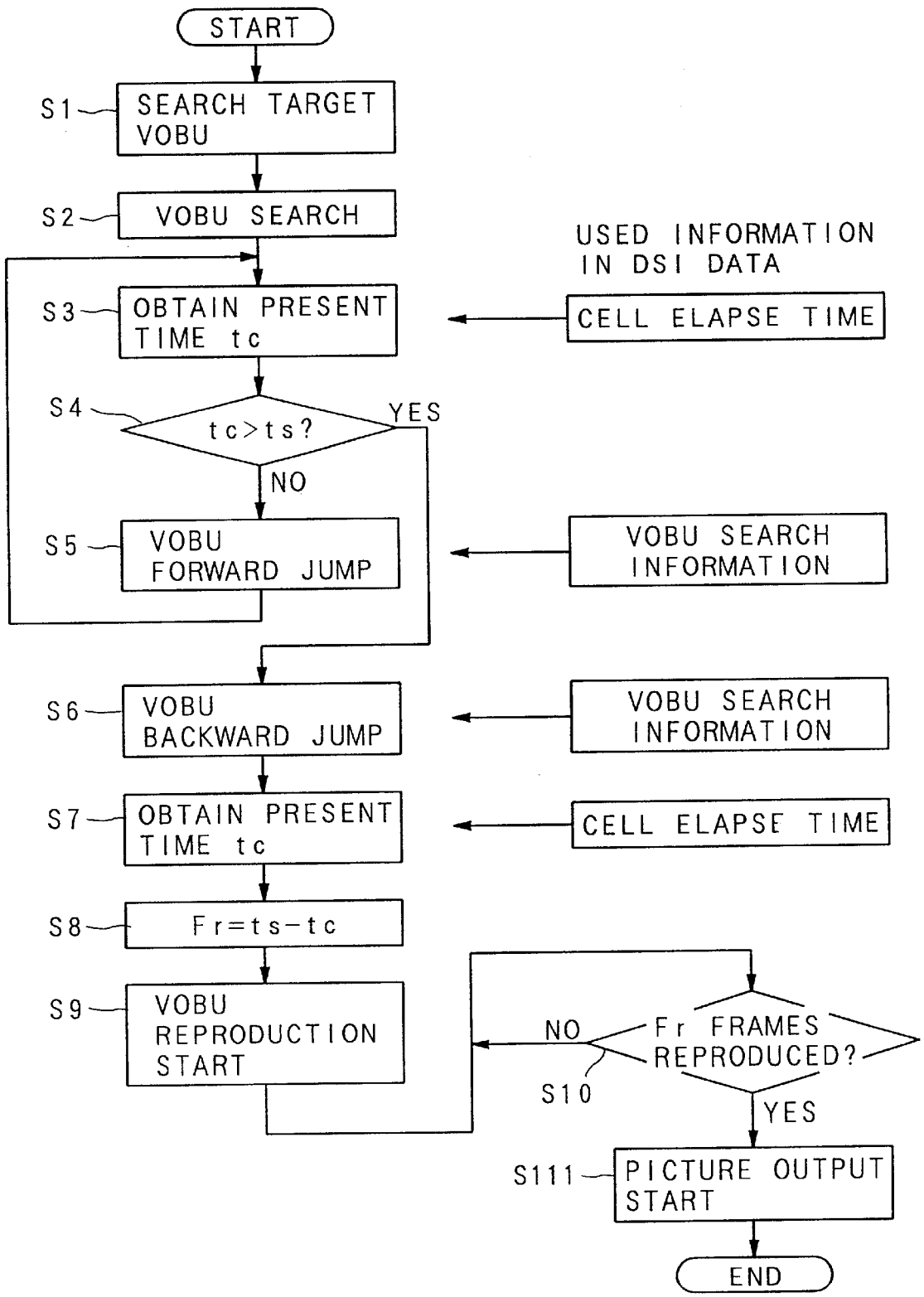
FIG. 11 is a flow chart showing a time search operation of the embodiment in FIG. 8.

At first, a time search operation, which is a typical reproducing operation by use of the DSI data 51 is explained, mainly as for the operation of the system controller 100, with reference to a flow chart of FIG. 11. Here, the time search reproduction is an operation to perform a search of a frame picture, which is specified by the audience through the input unit 98, by use of the VOB unit search information and the elapse time information, which indicates the elapse time in the cell 20 and is recorded in the DSI data 51, and to display the picture corresponding to the searched position. The frame picture is a picture, which is reproduced in correspondence with either one of the I, B and P pictures in the GOP 52 shown in FIG. 2.

As shown in FIG. 11, in the time search operation, when a target time ts which corresponds to the frame picture to be searched is firstly inputted by the input unit 98, the cell 20 which includes the inputted target time ts is calculated to be determined on the basis of the time search information for each PGCI included in the VTS 3, and the cell reproduction time information, which indicates the reproduction time period of each cell 20 in the PGCI. And that, the VOB unit 30 having a head frame, which is closest to the target time ts and is prior to the target time ts with respect to a predetermined time resolution (e.g. 10 seconds) as a standard, is calculated to be determined (step SI). Then, the navi-pack 41 positioned at the head of the VOB unit 30, which is calculated to be determined, is searched by jumping the optical pickup 80 (step S2), and the time tc corresponding to the head frame picture recorded at the position to which the optical pickup 80 is jumped is obtained at an accuracy higher than the aforementioned time resolution, by referring to the elapse time information, which indicates the elapse time in the cell 20 and is recorded in the DSI data 51 in the searched navi-pack 41 (step S3).

After that, the target time ts and a present time tc corresponding to the present position are compared with each other (step S4). At this time, since the optical pickup 80 is positioned at a position before the position corresponding to the target time ts, the present time tc corresponding to the present position of the pickup 80 is earlier than the target time ts (step S4: NO). Thus, the pickup 80 is jumped to the VOB unit 30 positioned forward (i.e. timely in the future) by referring to the VOB unit search information in the DSI data 51 corresponding to the present position of the pickup 80 (step S5). Then, the present time tc corresponding to the position, to which the pickup 80 is newly jumped. Is obtained (step S3). By repeating the above mentioned operations, the pickup 80 is finally jumped to the VOB unit 30, which is forward (i.e. timely in the future) by one unit of the VOB unit 30 including the target time ts. Then, if it is judged that the jump has been performed to the VOB unit 30 positioned forward by one unit of the VOB unit 30 including the target time ts (step S4: YES), the pickup 80 is jumped to the VOB unit 30 positioned backward (i.e. timely in the past) by one unit, by referring to the VOB unit search information in the DSI data 51 included in the VOB unit 30 to which the pickup 80 is jumped (step S6). By virtue of the above explained operations at the steps S1 to S6, it is possible to move the pickup 80 to the head of the VOB unit 30 including the target time ts.

After that, the present time tc corresponding to the present position of the pickup 80 is obtained by referring to the time elapse information, which indicates the elapse time period in the cell 20 and is recorded in the DSI data 51 in the VOB unit 30 including the target time ts (step S7). At this time, the present time tc is equal to a time corresponding to a frame number of the frame picture at the head of the VOB unit 30 including the target time ts, which is counted from the head of the PGC 61 to which the VOB unit 30 including the target time ts belongs.

Then, the number of frames Fr, as a difference between the frame picture corresponding to the present time tc and the frame picture corresponding to the target time ts (i.e. Fr=ts–tc), is obtained (step S8). Next, there production is started from the frame picture at the head of the VOB unit 30 including the present position of the pickup 80 (step S9), and the picture output is stopped by the amount corresponding to the number of frames Fr (step S10). If the reproduction is finished by the number of frames Fr (step S10: YES), the picture output is started from the picture at that time (step S111), and the time search operation is ended.

As described above, the reproduction can be started from the picture corresponding to the specified target time ts by use of the elapse time information which indicates the elapse time period in the cell 20 and the VOB unit search information, which are recorded in the DSI data 51 obtained before it is inputted to the track buffer 83.

Nextly, the seamless angle change reproduction, which is a reproducing operation with seamless angle switching or changing, as another reproducing operation by use of the DSI data 51, mainly as for the operation of the system controller 100, is explained with reference to a flow chart of FIG. 12. The judgment whether the angle change reproduction is seamless or non-seamless is judged on whether the angle jump destination information is described in the DSI data 51 or the PCI data 50.

Figure 12:
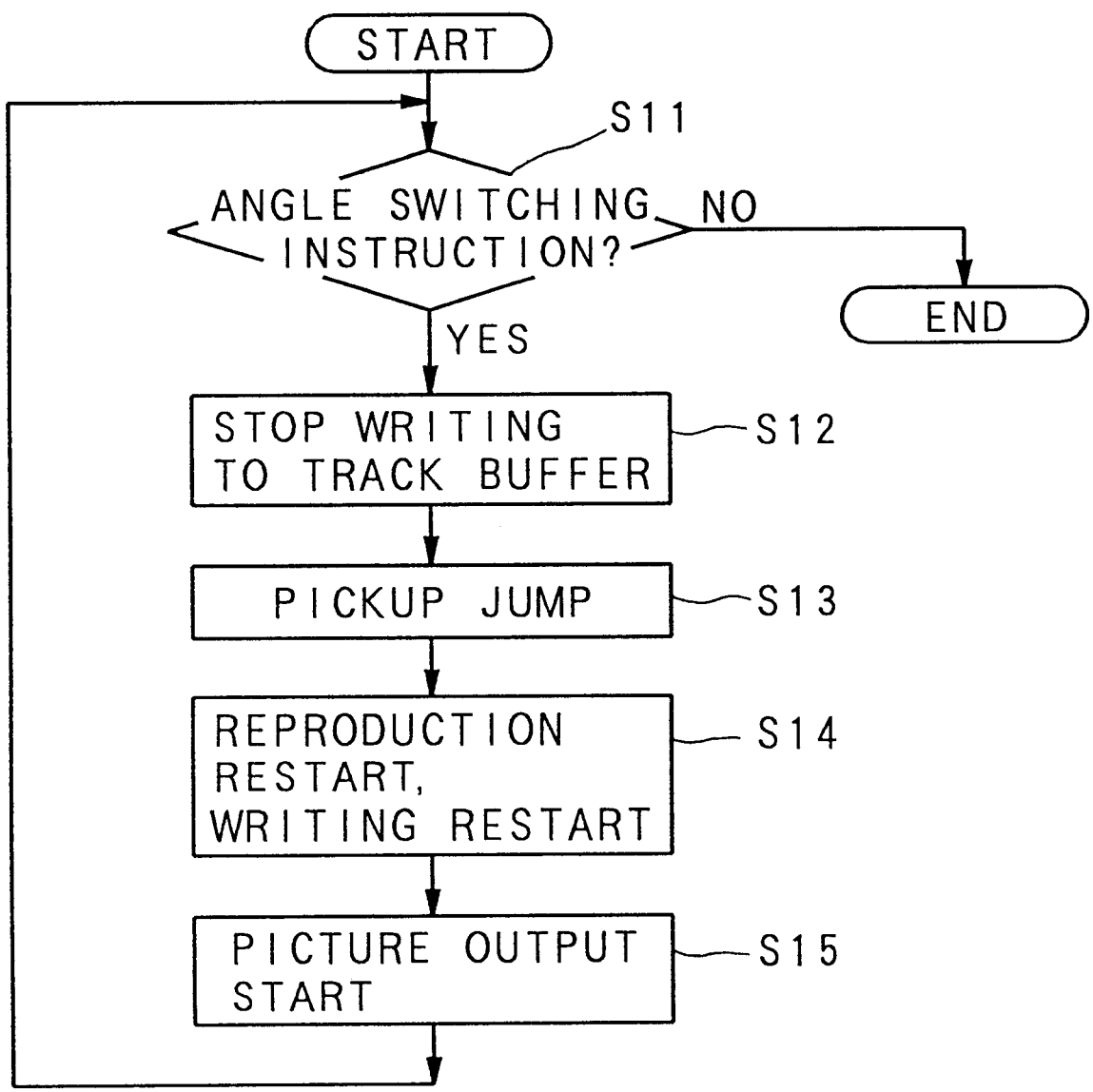
FIG. 12 is a flow chart showing a reproducing operation with seamless angle switching of the embodiment in FIG. 8.

As shown in FIG. 12, in the seamless angle change reproduction, it is firstly judged whether or not the angle switching or changing instruction is inputted by the audience through the input unit 98 (step S11). If the instruction is inputted (step S11: YES), the system controller 100 refers to an end address information of the interleaved unit IU under reproduction, which is described in the seamless information in the DSI data 51 (refer to FIG. 5A), as for the angle corresponding to the picture plane under reproduction. Then, the reproduction is performed until this end address while the corresponding demodulation signal Sdm is written into the track buffer 83, and after that, the writing in operation is temporarily stopped (step S12).

At the same time as stopping the writing in operation, the system controller 100 refers to the angle jump destination information in the DSI data 51 (refer to FIG. 5A) corresponding to the angle before changing the angle, so as to detect the address information as for the angle destination described therein, and the pickup 80 is jumped to the record position on the DVD 1 corresponding to this detected address information (step S13). Then, the writing in operation to the track buffer 83 is restarted by restarting the reproduction from the record position to which the pickup 80 is jumped (step S14), and the picture output of the reproduced video information etc. is started (step S15). By the above explained operations, the last VOB unit 30 before changing the angle and the first VOB unit 30 after changing the angle are timely connected in the track buffer 83, so that the seamless reproduction is realized on the displayed video image. Namely, the reproducing apparatus with switching or changing the timely continuous angle in the seamless manner can be realized.

Figure 13:
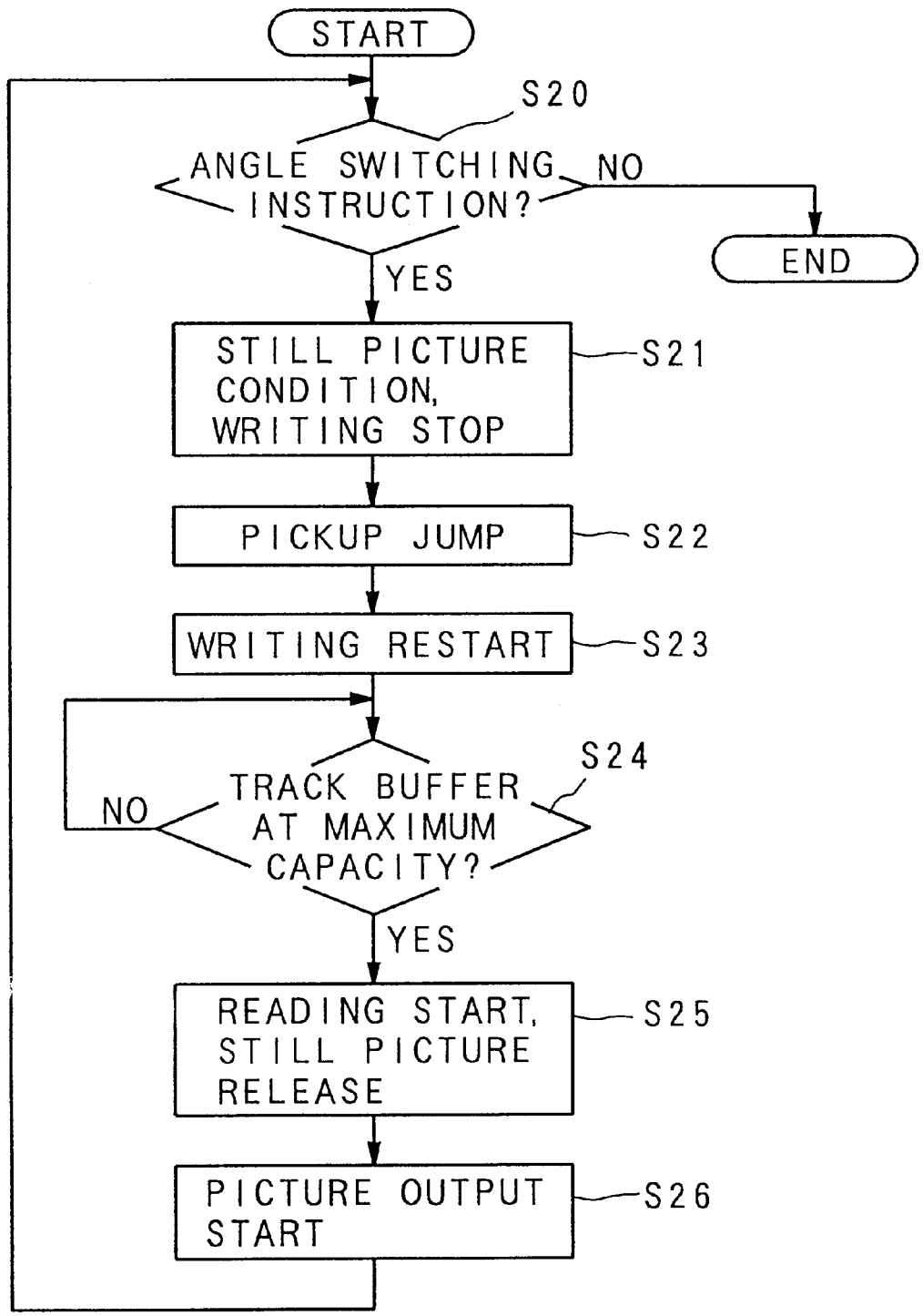
FIG. 13 is a flow chart showing a reproducing operation with non-seamless angle switching of the embodiment in FIG. 8.

Nextly, the non-seamless angle change reproduction, which is a reproducing operation with non-seamless angle switching or changing, as a typical reproducing operation by use of the PCI data 50 is explained, mainly as for the operation of the system controller 100, with reference to a flow chart of FIG. 13.

As shown in FIG. 13, in the non-seamless angle change reproduction, it is firstly judged whether or not the angle switching or changing instruction is inputted by the audience through the input unit 98 (step S20). If the instruction is inputted (step S20: YES), the system controller 100 immediately changes the display condition to the still picture display condition as for the angle corresponding to the picture plane under reproduction. The system controller 100 discards all of the data accumulated in the track buffer 83, and stops writing in the demodulation signal Sdm to the track buffer 83 (step S21).

At the same time as stopping this writing in operation, the system controller 100 refers to the angle jump destination information in the PCI data 50 (refer to FIG. 5B) corresponding to the angle before changing it, so as to detect the address information as for the angle destination described therein, and the pickup 80 is jumped to the record position on the DVD 1 corresponding to this detected address information (step S22). Then, the writing in operation to the track buffer 83 is restarted by restarting the reproduction from the record position to which the pickup 80 is jumped (step S23). Then, when the demodulation signal Sdm is written in and accumulated in the track buffer 83 to its maximum memory capacity (step S24: YES), the first VOB unit 30 of the video information corresponding to the angle after changing it is read out from the track buffer 83, and the still picture display condition is released or canceled (step S25). Thus, the picture output of the video information etc. is started from the VOB unit 30 after changing the angle (step S26). By the above explained operations, it is possible to start the picture output from one VOB unit 30 for the angle after changing it, which is timely approximately same as another VOB unit 30 which is being displayed.

As described above, according to the reproducing apparatus SS2 of the present embodiment, since the DSI data 51 is extracted before the demodulation signal Sdm is inputted to the track buffer 83, the DSI data 51 corresponding to the detected position on the DVD 1 of the optical pickup 80 can be obtained, so that it is easy to search the record information R to be reproduced.

Further, since the PCI data 50 is extracted after the demodulation signal Sdm is outputted from the track buffer 83, the reproduction and display control can be performed in correspondence with the timing of actually displaying the record information.

Furthermore, since the high light information has the effective time interval information indicating its effective time interval, it is possible to perform the reproduction and display control of the selection items on the menu picture plane etc. in correspondence with the reproduction of the record information such as the video information etc., and it is also possible to make the selecting operation effective or valid by the high light information by an arbitrary time period.

Since the DSI data 51 includes the VOB unit search information indicating the record position on the DVD 1 of the data to be accessed (detected), the VOB unit search information indicating the target position can be obtained before it is inputted to the track buffer 83. Thus, it is possible to easily perform the searching operation of the record information R to be reproduced, on the basis of the VOB unit search information.

Since the lower limit value of the reproduction time period of the data portion between the adjacent navi-packs 41 respectively is set to 0.4 second, the memory capacity of the PCI buffer 94 can be reduced correspondingly, so that the cost of the reproducing apparatus SS2 itself can be decreased.

In each of the above described embodiments, the explanations have been done for the case where the information compressed by the variable rate by means of the MPEG 2 method is recorded on the DVD 1, and the case where the information recorded in that manner is reproduced. However, the present invention is not limited to these cases. Instead, as long as a reproducing system utilizes the track buffer at the time of reproduction, a constant rate compression method may be employed as the compression method in the present invention. Further, it is possible to apply the present invention to the recording and reproducing operations of various information regardless of the compression methods. Furthermore, the embodiment of the information record information is not limited to the aforementioned DVD 1.

The invention may be embodied in other specific forms without departing from the spirit or essential characteristics thereof.

The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information record medium from which record information is reproduced by an information reproducing apparatus, comprising:

a plurality of data units each corresponding to a predetermined reproduction time interval, each one of the plurality of data units including navigation information and record information corresponding to at least one of video information, audio information, and sub-picture information, wherein the navigation information is divided into search control information and reproduction display control information such that the search control information and the reproduction display control information are separately extracted at different stages while the record information is being reproduced, the search control information included in each one of the plurality of data units including address information that indicates addresses of other data units that have a predetermined positional relationship with each one of the plurality of data units.

2. The information record medium according to claim 1, wherein the predetermined reproduction time interval is not less than 0.4 seconds.

3. The information record medium according to claim 1, wherein the predetermined reproduction time interval is not less than a predetermined lower limit value.

4. The information record medium according to claim 1, wherein the navigation information is positioned at a beginning portion of the data unit.

5. An information record medium from which record information is reproduced by an information reproducing apparatus, comprising:

a plurality of data units each corresponding to a predetermined reproduction time interval, each one of the plurality of data units including navigation information and record information corresponding to at least one of video information, audio information, and sub-picture information, wherein the navigation information is divided into search control information and reproduction display control information, the search control information included in each one of the plurality of data units including address information that indicates address of other data units that have a predetermined positional relationship with each one of the plurality of data units, the reproduction display control information includes highlight information for highlighting button information displayed based on the sub-picture information, the highlight information includes color information indicating a color of a button to be highlighted, position information indicating display position corresponding to the button to be highlighted, and movement information indicating a movement destination to be highlighted and wherein the button information is to be selected by a user's instruction, and wherein the highlight information further includes effective time interval information indicating an effective time interval during which an acceptance of the user's instruction is allowed.

6. An apparatus for reproducing record information from an information record medium having a plurality of data units each corresponding to a predetermined reproduction time interval, each one of the plurality of data units including navigation information and record information corresponding to at least one of video information, audio information, and sub-picture information, wherein the navigation information is divided into search control information and reproduction display control information, the search control information included in each one of the plurality of data units including address information that indicates addresses of other data units that have a predetermined positional relationship with each one of the plurality of data units, the apparatus comprising:

a pickup for reading the record information from the information record medium to obtain a detection signal;

a demodulation circuit for demodulating the detection signal to obtain a demodulation signal;

first extracting means for extracting the search control information from the demodulation signal;

a demodulation signal buffer for temporarily storing the demodulation signal and outputting the stored demodulation signal;

second extracting means for extracting the reproduction display control information from the demodulation signal outputted from the demodulation signal buffer; and a controller for controlling reproduction of the record information based on the extracted search control information, and for controlling display of the reproduced record information based on the extracted reproduction display control information.

7. The apparatus according to claim 6, wherein the predetermined reproduction time interval is not less than 0.4 seconds.

8. The apparatus according to claim 6, wherein the predetermined reproduction time interval is not less than a predetermined lower limit value.

9. The apparatus according to claim 6, wherein the navigation information is divided into the search control information and the reproduction display control information such that the search control information and the reproduction display control information are separately extracted by the first extracting means and the second extracting means, respectively, at different stages while the record information is being reproduced.

10. The apparatus according to claim 6, further comprising:

a search control information buffer for temporarily storing the search control information extracted by the first extracting means;

a display control information buffer for temporarily storing the reproduction display control information extracted by the second extracting means; and a display control information decoder for decoding the reproduction display control information outputted from the display control information buffer.

11. The apparatus according to claim 10, wherein the reproduction display control information includes highlight information for highlighting button information displayed based on the sub-picture information, the apparatus further comprising:

third extracting means for extracting the highlight information from the reproduction display control information;

a highlight buffer for temporarily storing the highlight information extracted by the third extracting means; and a highlight decoder for decoding the highlight information outputted from the highlight buffer, wherein the controller controls display condition in accordance with the highlight information.

12. The apparatus according to claim 6, wherein the controller controls a position of the pickup in accordance with the search control information.

* * * * *